United States Patent [19]
Bemiss

[11] 3,756,495
[45] Sept. 4, 1973

[54] BOILABLE BAKEABLE PACKAGE

[75] Inventor: Robert P. Bemiss, Hillsborough, Calif.

[73] Assignee: Robalex, Inc., as Trustee, San Francisco, Calif.

[22] Filed: Mar. 2, 1972

[21] Appl. No.: 231,204

Related U.S. Application Data

[63] Continuation-in-part of Ser. No. 83,704, Oct. 26, 1970, and a continuation-in-part of Ser. No. 154,784, June 21, 1971, and a continuation-in-part of Ser. No. 192,720, Oct. 14, 1971.

[52] U.S. Cl............ 229/14 BL, 93/36.01, 206/46 F
[51] Int. Cl................ B65d 5/56
[58] Field of Search................ 229/14 B, 32, 14 BI, 229/14 BL, 14 H, 31, 30, DIG. 4; 220/65, 62; 206/46 F; 93/36.01

[56] References Cited
UNITED STATES PATENTS

| | | | |
|---|---|---|---|
| 1,851,518 | 3/1932 | McGovern | 229/DIG. 4 |
| 1,878,290 | 9/1932 | Overton | 229/DIG. 4 |
| 2,310,534 | 2/1943 | Markey | 220/976 X |
| 2,407,118 | 9/1946 | Waters | 229/14 BL |
| 2,657,998 | 11/1953 | Peters | 229/14 R |
| 3,195,425 | 7/1965 | Taggart | 229/14 B X |
| 3,338,020 | 8/1967 | McGee | 93/36.01 X |
| 3,390,618 | 7/1968 | McArdle | 93/36.01 |
| 3,536,248 | 10/1970 | Odenhagen | 229/31 |

Primary Examiner—Davis T. Moorhead
Attorney—James M. Naylor, Frank A. Neal and John K. Uilkena

[57] ABSTRACT

A laminated or multi-wall carton or tray is provided which has a self-supporting outer layer or wall portion of paperboard which is a laminated structure, and includes a paperboard with a plastic or foil layer adhered or laminated thereto. The laminated layer of material may be on one or both sides of the paperboard adhered to the surface, preferably before the tray or carton is die cut and formed into a tray or carton. This laminated structure or paperboard outer wall of the carton or tray is an independent self-supporting unit during the manufacture of the laminated tray or carton though it is not sufficiently strong to form a carton or tray by itself. A plastic liner is thermo-vacuumformed into the paperboard tray or carton in contact with the lamination on the paperboard therein to provide a boilable bakeable liquid-tight leakproof lining for the tray. The strengthened carton structure in outer paperboard supporting structure coated with a plastic or foil film heat resistant at baking temperatures and an inner plastic film or liner for contact with the food if food is the product being packaged.

A laminated or multilayer wall tray or carton is provided with a corner construction to resist leaking of vacuumized containers for example, and to form a simple stop for use in nesting of the cartons.

12 Claims, 12 Drawing Figures

PATENTED SEP 4 1973 3,756,495

BOILABLE BAKEABLE PACKAGE

This application is a Continuation-In-Part of my co-pending Application Ser. No. 83,704, filed Oct. 26, 1970 for BOILABLE-BAKEABLE PACKAGE & METHOD, (Case 2600), my co-pending Application Ser. No. 154,784, filed June 21, 1971 for BOILABLE BAKEABLE PACKAGE & METHOD (Case 2600-A), and my Application Ser. No. 192,720 filed Oct. 14, 1971 for BOILABLE BAKEABLE PACKAGE & METHOD (Case 2688).

DESCRIPTION OF THE INVENTION

This invention relates to thermo-vacuum formed laminated packages such as trays or cartons, each package consisting of a fabricated plastic coated or laminated paper-board outer layer which has its respective corners secured together in some conventional fashion such as by "Klik-Lok" construction or by adhesive securing such as gluing so that a self-supporting outer structure of paperboard is formed for use in manufacture and the application of any graphic art material desired in connection with the product container therein. The paperboard may be impregnated with a suitable material such as borax to provide heat resistance and to minimize the amount of charring during cooking, the innermost or third lamina comprises an inner layer of film which is thermo-vacuum formed inside of the finished outer paperboard and film lamina and secured to be engaged with the plastic lamina thereof.

The structural features of the carton are such that it provides for effective sealing of the corners and open edges without leaks as well as providing a simple stop for nesting of the tray-shaped carton.

It is an object of the invention therefor to provide a combination of a plastic or foil coated paperboard lamina and a film lamina in a folding carton or tray of suitable character which can be subjected to either boiling or baking.

Another object of the invention is to provide a package of the above character in which the tray or carton is constructed to hold liquids and to prevent wicking thereof into the paperboard.

A further object of the invention is to provide a structure of the above character where the plastic film used in laminating the paperboard for the carton will be of heat-resistant character.

A further object of the invention is to provide a convenient and economical way of providing for stops to control the indexing of the cartons during nesting.

Still another object of the invention is to provide a folding carton or tray construction in which the corner construction is such that the corners meet flush and close off any openings to prevent the film from being drawn into it and thereby causing puncture, and to allow for ease of sealing against leaks.

The above and other objects of the invention are attained as described in connection with certain preferred embodiments of the invention as illustrated in the accompanying drawings, in which.

Figure 1:
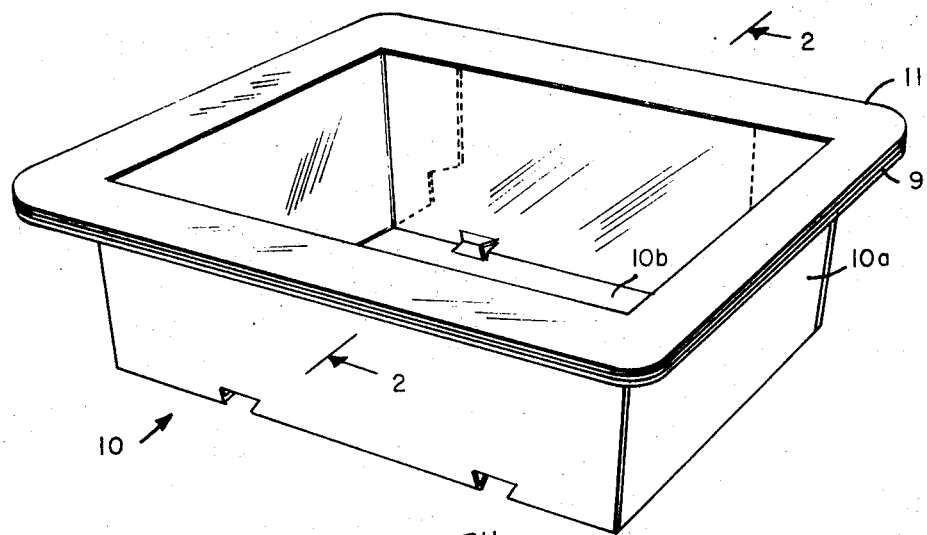
FIG. 1 is a perspective view of a tray or carton embodying the invention.

Referring to the FIGS. 1-4 illustrating the first two forms of the invention, each tray may comprise an outer air permeable paperboard structure or lamina 10 (FIG. 2) of upwardly diverging sidewalls 10a and a bottom wall 10b, the sidewalls and the bottom wall having a plastic coating or liner on the outside thereof forming the interior of the tray or carton and this plastic layer 9 is preferably of the type of plastic which is capable of withstanding temperatures of 350° and higher in the bakeable range. The thermo-formed sheet 11 on the inside covers all the open edges exposed in die cutting and prevents wicking of oils or moisture into the center of the lamination, or the center paperboard coming in contact with the food contents. This structure also provides for the use of recycled paperboard ordinarily not used for food products. The inner layer of film 11 is thermo-vacuum formed inside of the outer paperboard laminated structure 10 and in contact with the plastic lining 9 thereon and this inner film is preferably also high temperature film such as nylon, high density polyethylene or the like.

In practice the thickness of the inner layer of film will be 0.006 to 0.010 mills and the combined thickness of the paperboard wall and the plastic coating thereon will be from 0.009 to 0.020 mills. The plastic coating 9 on the inside of the paperboard of the carton may be from 0.001 to 0.003 mills. In thermo-vacuum forming the film into the wall on the inside of the carton, the film is reduced as the film is stretched and thinned and a 0.008 mill thickness film, for example, may be reduced to as little as 0.003 inch or 0.004 inch or mills.

Figure 2:
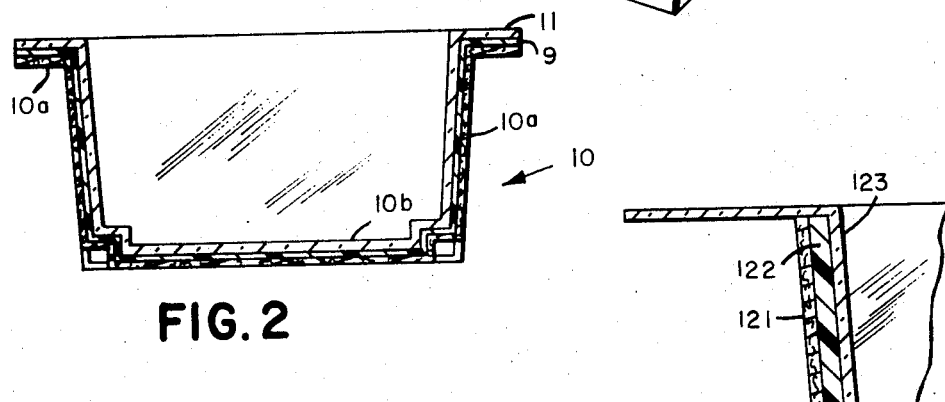
FIG. 2 is a section on the line 2—2 IN FIG. 1.

As shown in FIGS. 1 and 2, plastic coated paperboard is used which is capable of being baked and being frozen. Polyimide is another film which is not as yet FDA approved, and which will stand 750° F and minus 450° F. All the plastic film mentioned can be employed in the cleaning and packaging of critical pharmaceuticals and critical moisture sensitive drugs. The paperboard may be coated with any plastic compatible to the thermo-vacuum formed plastic sheet.

Figure 4:
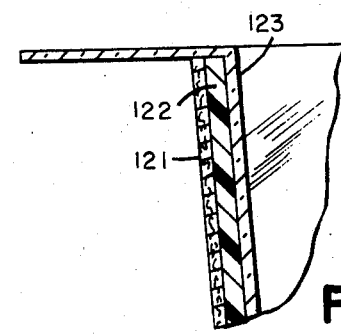
FIGS. 3 and 4 are views similar to FIGS. 1 and 2 and show a modification.
Figure 3:
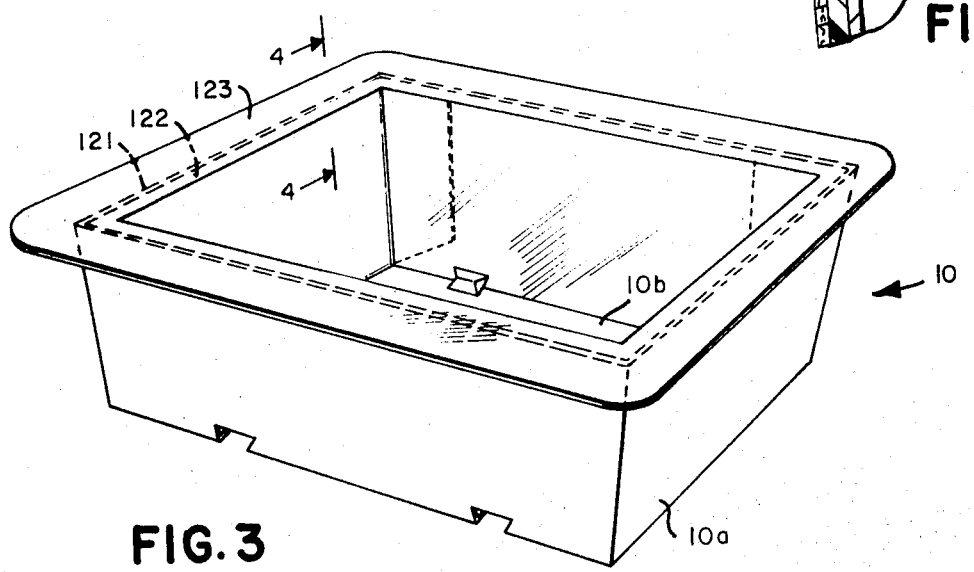

Referring to FIGS. 3 and 4, a modified form of the invention is shown wherein the tray or carton may comprise an outer paperboard layer or carton part 121 which has vacuumformed therein a heat insulating layer of foamed plastic 122. An inner thermo-formed layer or carton part of foamed plastic film 122 is either secured or closely conforms in shape to carton part 121. The foamed plastic available in sheet form from 0.008 mills to 0.010 mills thick and may include foamed polyethylene, foamed polypropylene, foamed polystyrene and foamed polyvinyl chloride. The inner layer 123 of film may be any one of the previously mentioned plastic films. As seen in FIG. 4 the paperboard terminates immediately below the flange providing a plastic flange of the liner for connection to the lid.

Referring to the third form of the invention illustrated in FIGS. 5-12, the carton of the instant invention may include a paperboard outer part which is coated with plastic and includes a bottom panel 15 which is connected by respective hinge scorelines 16 to side panels 13-13 and 14-14. At each end of the side panels 13 there are provided hinged glue flaps 12 having hinged scorelines 16a to the adjacent panel 13 and used in gluing the corners of the tray. At the outer edges of the panels 13 and connected thereto by respective hinged scorelines 17 are a pair of side flap portions 22 which in the erected position of the cartons form part of the rim or flange surrounding the open end of the carton for attachment of the lid. At the other two sides of the bottom panel 15 there are provided the side panel portions 14 which is similarly connected by hinged scorelines 18 to side flap portions 21 and side flap portions 21a—21a which also provide a part of the rim or flange. Each side flap portion 21 extends beyond the ends of the side flap 14 and has ear extensions 21a overlapping its sides 14a. Adjacent each ear extension 21a at the inner part there is provided a triangular portion or ear 25 which is cut free of the adjacent extension 21a at 25a and is attached to and carried by the side 14a of the panel 14 and as later described will form a nesting stop. It is to be noted that there is no scored line between each side panel or wall 14 and the respective ears 25.

Figure 7:
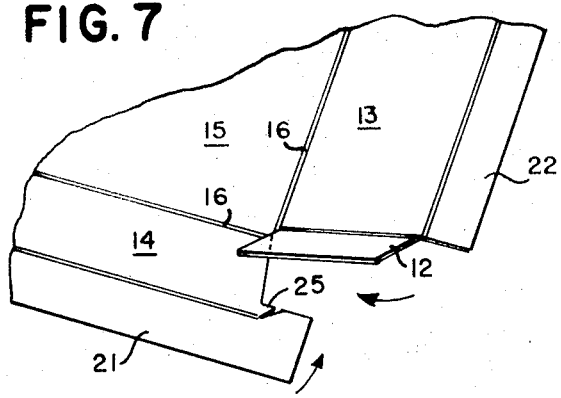
FIG. 7 is a perspective view illustrating the sequence of the folding steps in erecting the carton from the position of the blanks shown in FIG. 6.

In erecting a carton the glue flaps 12 are bent up to clear the side panels 14 and then the side panel portions 13 are bent upwardly about their scoreline connections 16 to the bottom panel 15 without bending of the side flap portions 22 and this places the glue flaps 12 and end panels 13 above the side panels 14 as seen in FIG. 7, for example. Thereafter, the panel 14 can be moved to erected position with its side flap portion 21 still unbent along the scoreline 18. The included angle of the side panels 13 and 14 when erected with respect to the horizontal bottom panel 15 is selected at say about 96° to 98° in accordance with the amount of angle desired for nesting.

Figure 5:
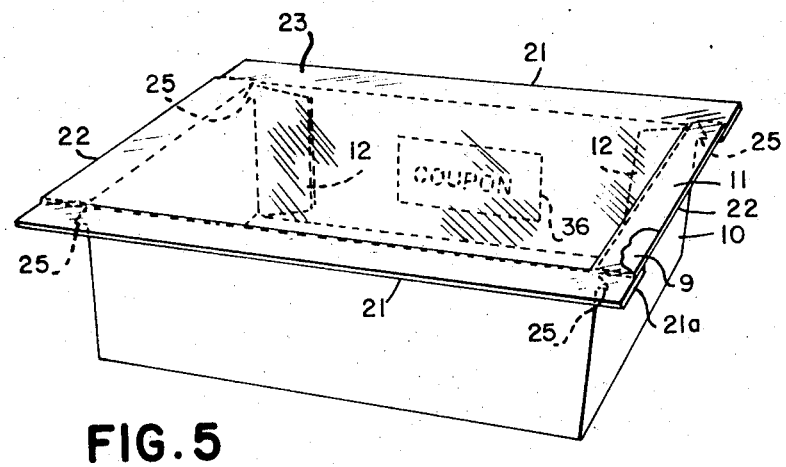
FIG. 5 is a perspective view of a tray or carton ready for filling.
Figure 6:
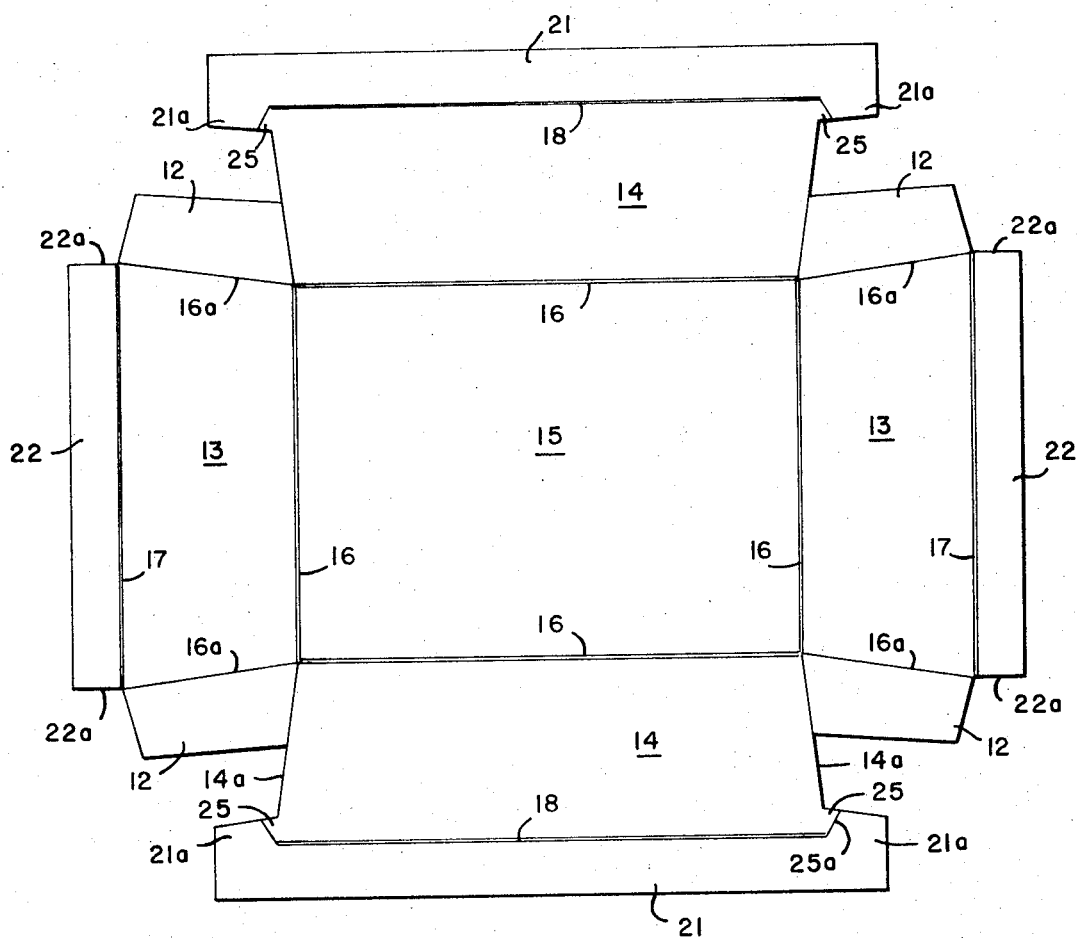
FIG. 6 is a plan view of the paperboard blank for the carton.
Figure 8:
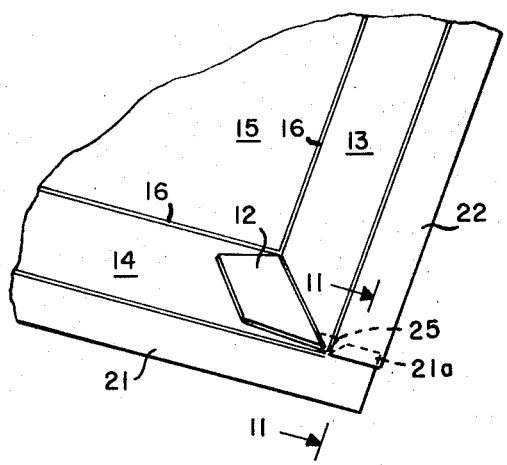
FIG. 8 is a perspective view of the carton after the folding has been completed.

After the carton is formed to the desired shape, the side flap portions 21 are first bent downwardly to a horizontal position with respect parallel to the bottom panel 15 so that the extensions 21a are in position to receive in overlapping relation the ends 22a of the side flap portions 22. Then the side flap portions 22 are bent downwardly to a horizontal position where they overlap the side panel portions 21 as seen in FIGS. 7 and 8, for example. Thereafter, the panels are held in this position and then the second layer 23 of plastic is thermovacuum-formed inside of the tray to provide the coating as seen in FIG. 5 which will cover all of the exposed cut surfaces of paperboard which are necessary to forming the carton therefor. This, as pointed out in connection with the paperboard part of the carton is of lightweight nature and lighter than the usual paperboard so as to allow the overlapping of the ears as shown at 21a with respect to the flap portions 22 so that the double thickness of board offers no problems in sealing to the film 23 under moderate pressure and heat to form a leak-proof joint.

Figure 9:
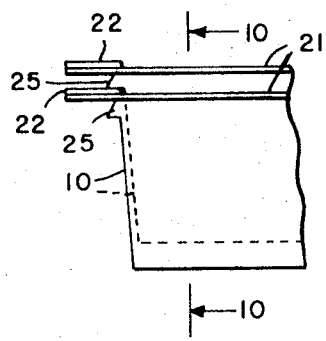
FIG. 9 is an elevational view of two cartons or trays stacked in nested relation.

It will be noted that when the side panels 14 are erected and the inside flap portions 21 folded down in a horizontal position, they are free of triangular portions 25 shown so that these triangular portions project as seen in FIGS. 5 and 9 for example, to form a nesting stop for the containers.

If desired, after the operation described above, a lid 26 is placed on the filled tray or carton with a plastic coating 24 weldable to the third layer 23 (FIG. 11) of plastic of the tray and heat and pressure is applied to complete the seal, and as stated above, the heat and pressure can easily be passed through the respective triple layers of paperboard, formed by the overlapping portions 21a, 22 and the lid 26. In the form of the invention using plastic coated paperboard, for example, nylon polyimide, or the like, it is immaterial that this layer is not approved for contact with food products provided it is compatible with a second layer 23 which is approved for food products. If desired, the lid may be attached to the carton in the conventional fashion by hinging.

It will be appreciated that the carton as formed has the inner plastic bag-like portion formed of the inner layer of plastic and conforming to the shape of the tray, and in one form of the invention this is not heat sealed to the tray but rests freely against it so that it will lift free with the lid. Also, if a layer of plastic is formed inside the tray as described above, there can be inserted a paper sign, a premium coupon, or a package containing a premium as illustrated at 36 in FIG. 5.

Also, in accordance with the instant invention by the use of a clear plastic, for example, such as polyethylene, desired graphic material can be printed inside the carton.

Figure 11:
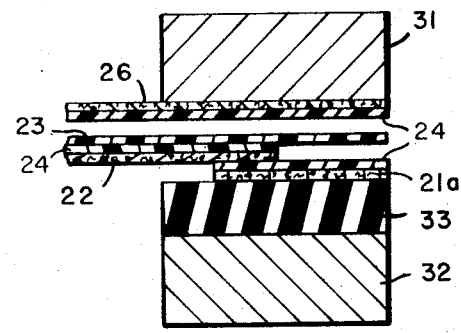
FIG. 11 is a fragmentary view illustrating the beginning of the operation of sealing one of the corners of the tray to the lid.
Figure 10:
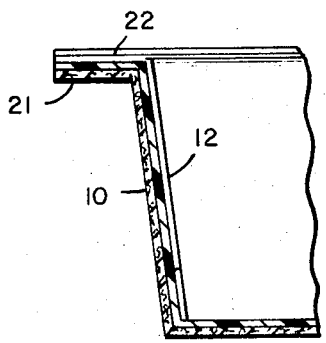
FIG. 10 is a sectional view of one carton, the view being taken as indicated by the line 10—10 in FIG. 9, but omitting the second carton which would otherwise be shown in section.
Figure 12:
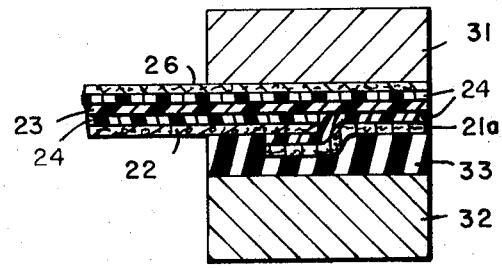
FIG. 12 is a schematic sectional view illustrating the relative parts approximately as positioned during the actual sealing operation.

Referring to FIGS. 11 and 12, a top sealing element 31 is shown above the lid 26 and a bottom sealing element 32 having a rubber pad 33 is shown below the flange of the carton at the overlap of flap portions 21a and 22. After the third layer, i.e. a sheet of polyethylene 23, has been thermovacuum formed into the carton, the plastic coated lid 26 is placed in overlying position with respect to the peripheral flange and the pressure elements 31 and 32 are brought towards each other to place the parts in the condition shown in FIG. 12 where the three overlapped layers of paperboard, two layers of coating and the layer of thermoformed plastic are fused together by the heat and pressure to prevent leakage.

The completely formed inner skin of plastic and the fused flaps at the corner joints provide a sealed package which will hold liquids including oils, and can be subjected to a vacuum or can be gas filled. Also, all the cut edges of the carton are protected from contact with food in the package so that recycled paperboard can be used. Alternatively, the package can be filled with an inert gas, such as nitrogen.

In the drawings the plastic layers have been exaggerated in thickness and sometimes shown schematically to facilitate clearness of the drawing and understanding of the invention.

While I have shown and described certain preferred embodiments of the invention, the invention is capable of variation and modification from the forms shown so

I claim:

1. A tray or carton structure including an outer tray or part of paperboard having a plastic layer secured thereon and having a bottom wall and four sidewalls, said plastic layer covering said bottom wall and said four sidewalls on the interior thereof, an inner tray or part comprising a thermo-vacuumformed layer of film corresponding closely to the inside contour of said outer part of paperboard and engaging said plastic coating, said plastic covered paperboard carton part and said plastic carton part providing mutual reinforcing elements having a combined wall strength to provide for handling as a container for articles.

2. A tray or carton structure as recited in claim 1, in which said plastic layer is a film layer.

3. A tray or carton structure as recited in claim 1, in which said plastic layer is a foamed plastic layer.

4. A tray or carton structure as recited in claim 1, in which said paperboard of said paperboard carton part is provided with an impregnation of a char retardant to increase its temperature resistance.

5. A tray or carton structure comprising a bottom wall, respective side walls hingedly connected to the four sides of the bottom wall, said side walls having means for permanent interconnection therebetween to hold the side walls in erected position as side walls of the tray or carton, each of the side walls having hingedly connected thereto a flap extension which can be bent about its hinge connection to be placed horizontally and parallel to the bottom wall in the erected position of the side walls where they are permanently connected to each other, one of said flap extensions being extended beyond the width of the adjacent side wall to which it is connected and also overlapping inwardly toward the bottom wall in the opened condition of the carton to overlying the sides of said adjacent side panel, and in the erected position of the carton, said projection beyond the ends of one set of side flaps, serving to match the width of the other side flaps to the other side panels of the carton, and the inward extensions on the side flaps serving to overlap the side flap extension connected to the side walls to enable erecting of the carton.

6. A tray or carton as described in claim 5, in which each overlapping end extension of said side of one set of side walls is cut away at an angle on the inner edge to provide a portion connected to a side wall which will not fold with the side down into horizontal position but remains projecting as a stop or index for nesting of similar cartons.

7. A tray or carton of the character described comprising a tray-like structure of paperboard having a coating of plastic thereon with the plastic disposed inwardly with respect to the carton being formed from the paperboard, said carton comprising a bottom wall, respective side walls connected by score lines to the bottom wall, and having means associated with the other side walls for permanent securing of the side walls to each other in erected position of the tray or carton, and a third layer of plastic forming the inside surface of the carton and being thermoformed within the tray to approximate the shape of the inside of the tray and covering all of the interior cut exposed edge portions of the carton.

8. A tray or carton as recited in claim 7, in which the third inner layer of the carton forms a plastic barrier which is shaped to the inside of the carton but is freely detachable therefrom.

9. A tray or carton as recited in claim 8, and including an insert between said third layer and a wall of the carton.

10. A tray as recited in claim 8, in which said third plastic layer is transparent and in which graphic material is present behind it.

11. In a tray or carton as recited in claim 8, in which the third layer of plastic forming the inside wall or surface of the tray or carton is heat sealed to and welded to the plastic coating on the paperboard part of the carton so as to be substantially integral therewith.

12. A tray or carton as recited in claim 5, in which a third layer of plastic is provided forming the inner surface of the carton and covering the inner surface and the side flap extensions forming a flange around the open end of the carton, in which said third layer provides a continuous surface extending around the rim or flange of the carton for heat sealing or attachment to a lid or a covering of similar or compatible plastic material.

* * * * *